(12) United States Patent
Carlson

(10) Patent No.: US 11,927,307 B1
(45) Date of Patent: Mar. 12, 2024

(54) INDUSTRIAL FLOOR SCRAPER EQUIPMENT SHIELD

(71) Applicant: Erik Carlson, Caldwell, NJ (US)

(72) Inventor: Erik Carlson, Caldwell, NJ (US)

( * ) Notice: Subject to any disclaimer, the term of this patent is extended or adjusted under 35 U.S.C. 154(b) by 302 days.

(21) Appl. No.: 17/559,551

(22) Filed: Dec. 22, 2021

(51) Int. Cl.
*F16P 1/02* (2006.01)
*E04G 23/00* (2006.01)

(52) U.S. Cl.
CPC .............. *F16P 1/02* (2013.01); *E04G 23/006* (2013.01)

(58) Field of Classification Search
CPC .................................. F16P 1/02; E04G 23/006
See application file for complete search history.

(56) References Cited

U.S. PATENT DOCUMENTS

| | | | | |
|---|---|---|---|---|
| 5,772,284 A * | 6/1998 | Lindsey | ................ | E04G 23/006 15/93.1 |
| 5,829,534 A * | 11/1998 | Easton | .................. | E04G 23/006 30/169 |
| 5,830,313 A * | 11/1998 | Smith | ................... | E04G 23/006 156/763 |
| 6,135,566 A * | 10/2000 | Anderson | ............. | E04G 23/006 299/37.1 |
| 6,273,513 B1 * | 8/2001 | Pope | ..................... | E04G 23/006 15/93.1 |
| 6,343,981 B1 | 2/2002 | Buchanan | | |
| 7,562,412 B1 * | 7/2009 | Anderson | ............. | E04G 23/006 15/93.1 |
| 2001/0022463 A1 * | 9/2001 | Pope | ..................... | E04G 23/006 299/36.1 |
| 2002/0190568 A1 * | 12/2002 | Anderson | ............. | E04G 23/006 299/37.1 |
| 2010/0201181 A1 * | 8/2010 | Pope | ..................... | E04G 23/006 299/37.1 |
| 2019/0106893 A1 * | 4/2019 | Anderson | ............. | E04G 23/006 |

\* cited by examiner

*Primary Examiner* — Daniel D Yabut
(74) *Attorney, Agent, or Firm* — Sanchelima & Associates, P.A.; Christian Sanchelima; Jesus Sanchelima

(57) ABSTRACT

An industrial floor scraper equipment shield having an industrial floor scraper assembly, a front shield assembly, a fastening assembly, a wedge shield assembly, and a side shield assembly is disclosed herein. The industrial floor scraper assembly includes a ride on floor scraping vehicle that has hydraulic hoses that are used to power and operate the scraper blade. The shields of the aforementioned assemblies are mounted to the front and sides of the industrial floor scraper, said shields are attached to said industrial floor scraper using said fastening assembly. Thereby covering the previously exposed hydraulic hoses and create a debris deflecting shield. Wherein the shield helps prevent the hydraulic hoses from being damaged by any flying sharp debris.

11 Claims, 6 Drawing Sheets

INDUSTRIAL FLOOR SCRAPER EQUIPMENT SHIELD

II. BACKGROUND OF THE INVENTION

1. Field of the Invention

The present invention relates to an industrial floor scraper equipment shield and, more particularly, to an industrial floor scraper equipment shield that is mounted to a front and lateral portion of a floor scraping vehicle to prevent damage by flying sharp debris.

2. Description of the Related Art

Several designs for industrial floor scraper equipment shield have been designed in the past. None of them, however, include an industrial floor scraper equipment shield that is mounted on a commercial hydraulic floor scraper and provide protection to electrical and hydraulic hoses from debris Applicant believes that a related reference corresponds to U.S. Pat. No. 5,830,313 issued for a ride on floor scraping machine. Applicant believes that another related reference corresponds to U.S. Pat. No. 6,343,981 issued for a vehicle for scraping a floor comprising cover plates for all the equipment. None of these references, however, teach of an industrial floor scraper equipment shield that includes a debris deflecting shield for the front portion of a ride on floor scraping vehicle wherein the shield is L-shaped and mounts in front of the hydraulic hoses used to power and operate the scraper blade in which the shield prevents the hoses form being damaged.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide an industrial floor scraper equipment shield that is design to move with the suspension system of a commercial hydraulic floor scraper and do not interfere with the operation of the floor scraping machine.

It is another object of this invention to provide an industrial floor scraper equipment shield that is ideal to prevent costly repairs and lost time on job.

It is still another object of the present invention to provide an industrial floor scraper equipment shield that protects exposed areas that are subject to damage.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

Figure 1:
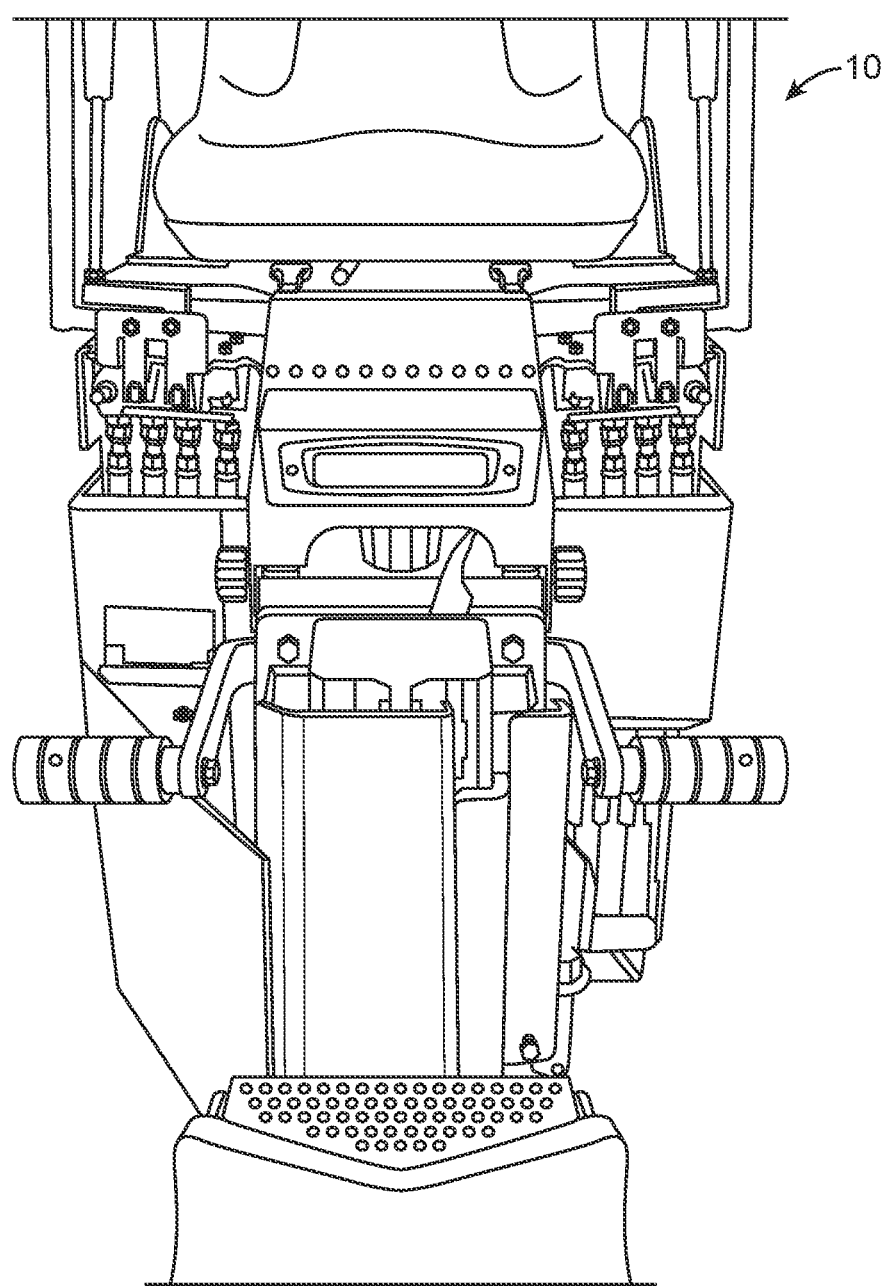

With the above and other related objects in view, the invention consists in the details of construction and combination of parts as will be more fully understood from the following description, when read in conjunction with the accompanying drawings in which:

FIG. 1 represents a full front view of the present invention 10.

Figure 2:
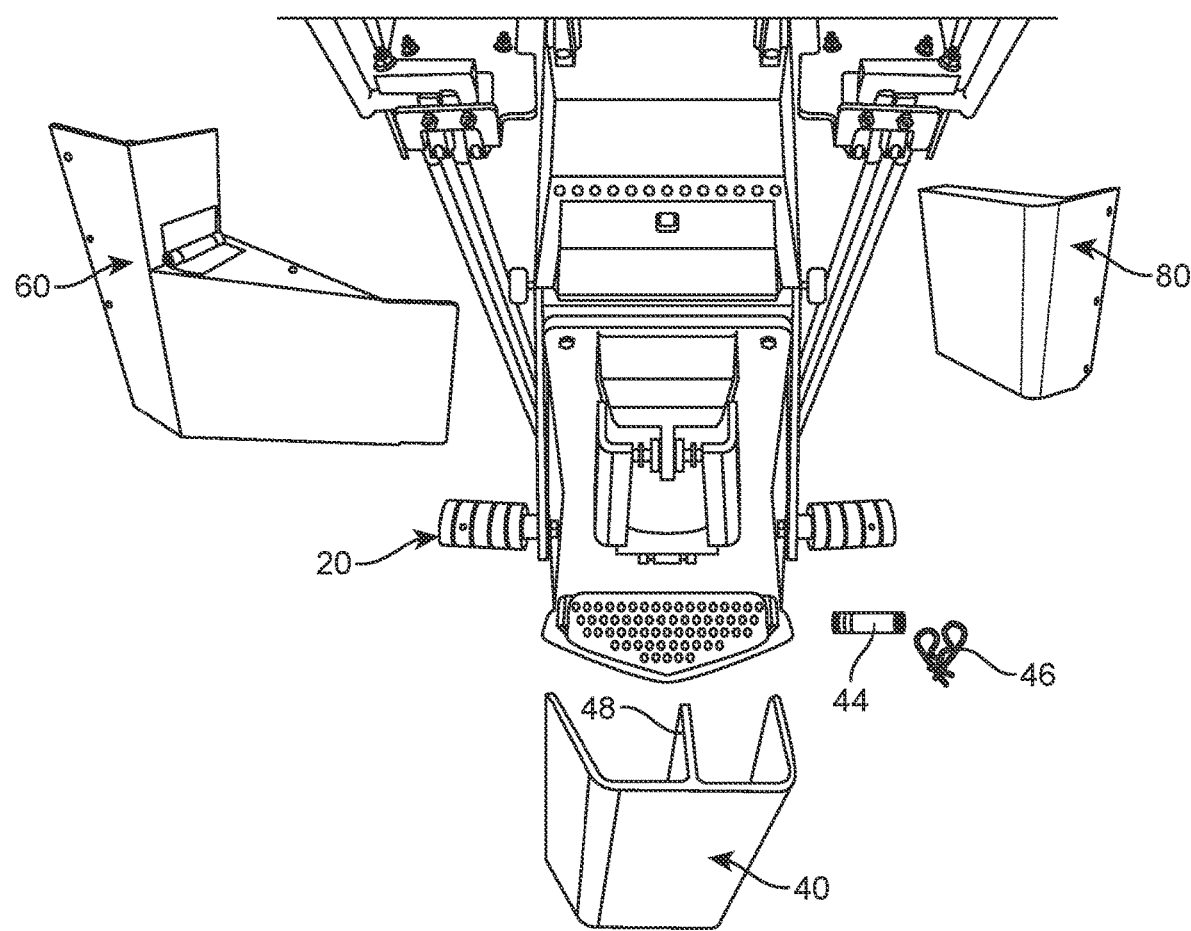

FIG. 2 shows a top view with a front shield 40, a wedge shield 60 and a side shield 80 are exploded from an industrial floor scraper 20.

Figure 3:
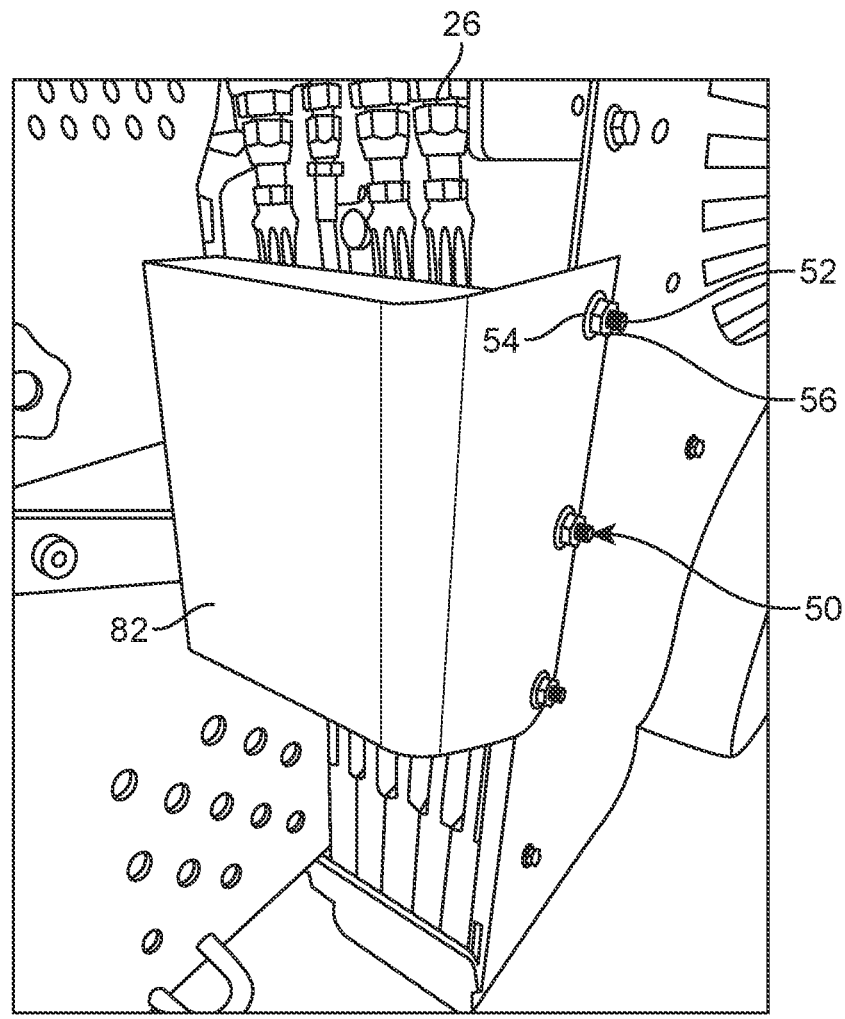

FIG. 3 illustrates an enlarged view of a side shield 82 mounted to the industrial floor scraper 20 for covering hydraulic hoses 26. It is also shown the fastening assembly 50 that includes a plurality of fasteners 52, a plurality of washers 54 and a plurality of nuts 56.

Figure 4:
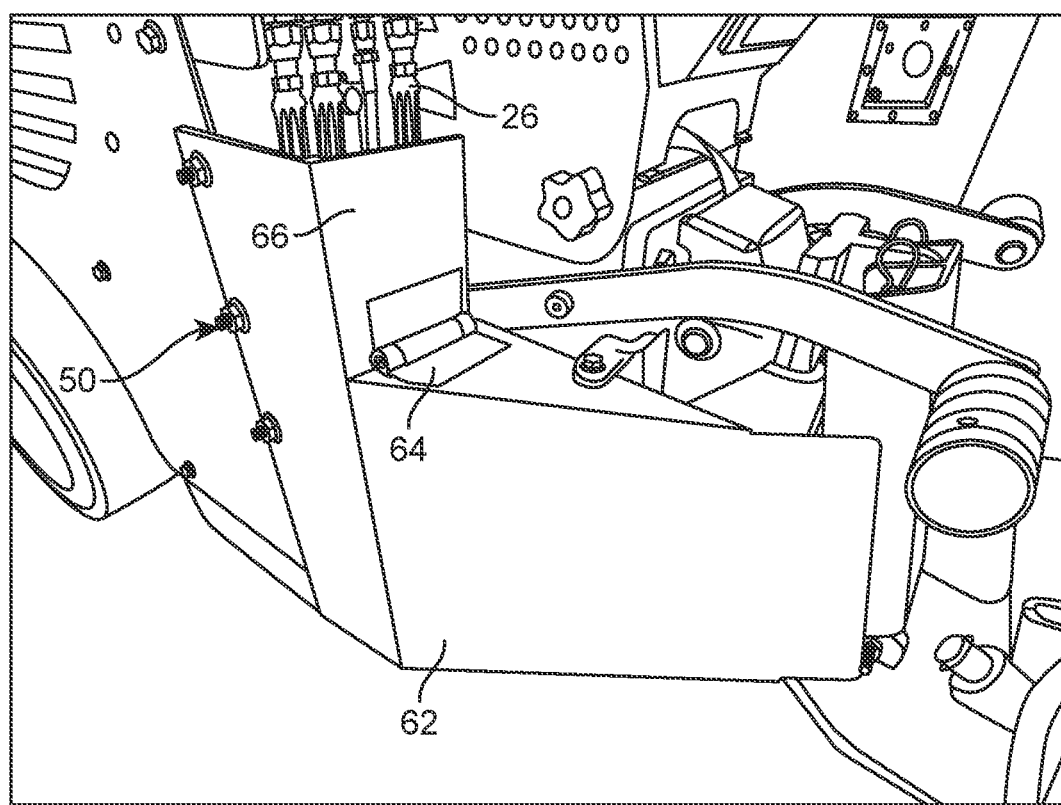

FIG. 4 is a representation of an enlarged view of the wedge shield 62 mounted to the industrial floor scraper 22 using the fastening assembly 50. It is depicted a hinge 64 and a door 66, all covering exposed hydraulic hoses 26.

Figure 5:
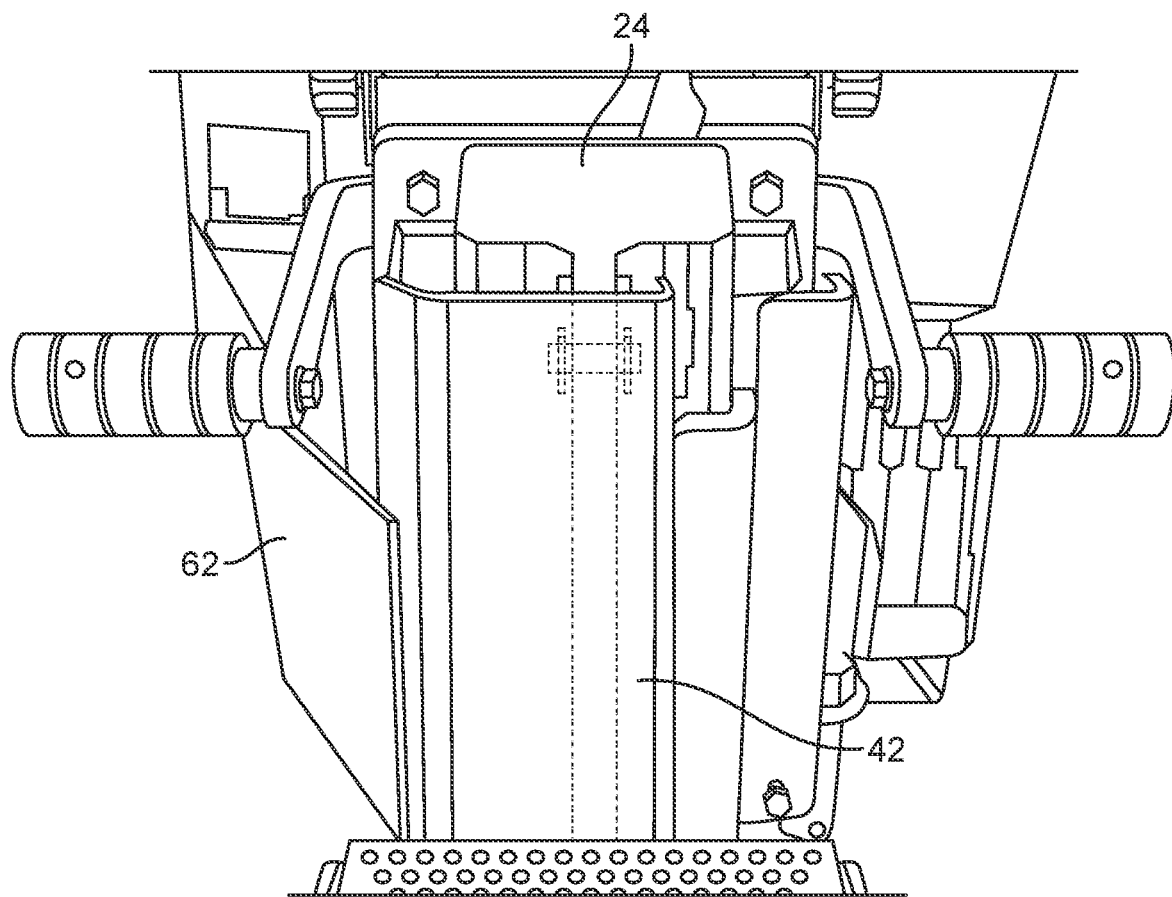

FIG. 5 illustrates an internal view of front shield 42 mounted on top of an actuator 24.

Figure 6:
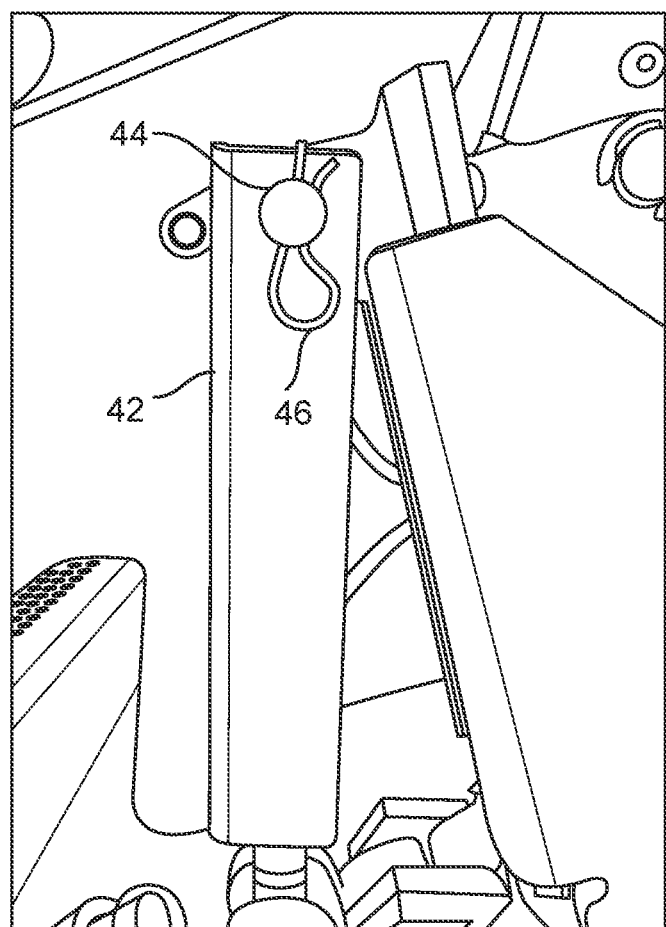

FIG. 6 depicts an enlarged view of the cotter pin 46 attached to the sheer pin 44 for securing the front shield 42.

V. DETAILED DESCRIPTION OF THE EMBODIMENTS OF THE INVENTION

Referring now to the drawings, where the present invention is generally referred to with numeral 10, it can be observed that it basically includes an industrial floor scraper assembly 20, a front shield assembly 40, a fastening assembly 50, a wedge shield assembly 60, and a side shield assembly 80. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The floor scraper assembly 20 includes an industrial floor scraper 22, actuator 24 and hydraulic hoses 26. Floor scrapers may have different embodiments like a walk-behind embodiment or ride-on embodiment. A preferable embodiment for said industrial floor scraper 22 may be a ride-on machine. An industrial floor scraper 22 may be powered by propane or batteries. Said industrial floor scraper 22 may be a heavy unit used for removing unwanted materials from a floor. Said industrial floor scraper 22 may be used for removing wooden floorboards, parquetry, ceramic tiles, or any variation thereof. Said actuator 24 may be located at the front side of said industrial floor scraper 22. In a preferable embodiment said actuator may be a hydraulic actuator, nonetheless, the actuator 24 may be a pneumatic actuator. Said actuator 24 may consist of a cylinder or fluid motor that uses hydraulic power to facilitate mechanical operations. Said actuator 24 as a hydraulic actuator may be able to exert considerable force due to the inherent resistance of liquids to be compressed. Said actuator 24 may have a distal end in which a demolition end unit may be mounted. A floor material may be removed when said actuator 24 applies a force to said demolition end unit that is in direct contact with said floor material. The hydraulic hoses 26 may be located in the lateral and front sides of said industrial floor scrapper 22. The hydraulic hoses 26 may be exposed, meaning that said hydraulic hoses 26 may not be covered by any part of a manufactured frame. Said hydraulic hoses 26 may be used anywhere in a hydraulic system. Said hydraulic hoses may be made of synthetic rubber tube and may be surrounded by a metal or a fiber. Hydraulic hoses 26 may be used for allowing a liquid to pass therethrough to then reach a hydraulic actuator.

The front shield assembly 40 includes a front shield 42, a shear pin 44, a cotter pin 46, and mounting bracket 48. Said front shield 42 may be made of a sturdy material such as steel, carbon steel, aluminum, alloy steel, stainless steel, or any variation thereof. Said front shield 42 may have a substantially rectangular shape. nonetheless, said front shield 42 may have another shape, such as a cuboid shape, a quadrangular shape, or any variation thereof. Said front shield 42 may have different dimensions depending on the size of an industrial floor scraper where the front shield 42 may be mounted. In a preferable embodiment said front shield 42 may be volumetrically efficient to be mounted on said actuator 24 of a commercial industrial floor scraper 24. Said front shield 42 may be used to protect said actuator 24 of sharp debris that may be fired when said industrial floor scraper 22 is removing material. The front shield 42 may be hollow. Said front shield 42 may have a left side, and a right side. Said front shield 42 may have a left portion opening on said left side. Said mounting bracket 44 may be located internally in said front shield 42. Said mounting bracket 44 may be aligned to said left portion opening. Said shear pin 44 may be used to mount said front shield 42 to said actuator 24. Said shear pin 44 may go through said left portion opening, through a distal end of said actuator 24 and through said mounting bracket 44. Said shear pin 44 may have a cylinder shape. Said shear pin 44 may be made of metal. Said shear pin 44 may permit that said front shield moves along said actuator 24 without impeding its movement. Said cotter pin 48 may be a metal fastener with two tines that may pass through a hole to fix parts tightly together. Along with said shear pin 46, said cotter pin 46 may hold together said front shield 42 with said actuator 24.

The fastening assembly 50 includes a plurality of fasteners 52, a plurality of washers 54 and a plurality of nuts 56. Said plurality of fasteners 52 may be threaded fasteners, preferable threaded fasteners may be screws. Said plurality of washers 54 may have the purpose reduce damage by evenly distributing a load of said plurality of fasteners 52 across the surface of the material. Each washer from said plurality of washers 54 may have a circular shape with an opening at the center wherein a fastener may pass therethrough. Each nut of said plurality of nuts 56 may consist of a circular shaped piece with a threaded interior surface.

Said wedge shield assembly 60 includes a wedge shield 62, a door 64, a hinge 66 and a cable clamp 68. Said wedge shield 62 may be made of a sturdy material such as metal, steel, carbon steel, aluminum, alloy steel, stainless steel, or any variation thereof. Said wedge shield 62 may have a substantially triangular shape. nonetheless, said wedge shield 62 may have another shape, such as a cuboid shape, a quadrangular shape, or any variation thereof. Said wedge shield 62 may have different dimensions depending on the size of an industrial floor scraper where the wedge shield 62 may be mounted. In a preferable embodiment said wedge shield 62 may be volumetrically efficient to be mounted on a left lateral said of a commercial industrial floor scraper 24. Said wedge shield 42 may be used to protect said hydraulic hoses and electrical connections of sharp debris that may be fired when said industrial floor scraper 22 is removing material. The wedge shield 62 may be hollow. Said wedge shield 62 may be mounted to a manufactured frame of said industrial floor scraper 22. Said plurality of fasteners 69 may be used for mounting said wedge shield 62 to said industrial floor scraper 22. When said wedge shield 62 may be located in a suitable place, said wedge shield 62 may be attached using said plurality of fasteners 52. In order to lock said wedge shield 62, said plurality of washers 54 and said plurality of nuts 56 may be coupled with said plurality of fasteners 52. Said door 64 may have a quadrangular shape, nonetheless, said door 62 may have other shapes like a rectangular shape, triangular shape, circular shape or any variation thereof. Said door 62 may be made of a sturdy material such as metal, steel, carbon steel, aluminum, alloy steel, stainless steel, or any variation thereof. Said door 64 may be located on a top portion of said wedge shield 62. Said door 64 may permit a user to access to the connections of said hydraulic hoses. Said door 64 may also allow a user to have access to the charging cord of said industrial floor scraper. Said hinge 66 may be coupled to said door 64. A preferable embodiment of said hinge 66 may be a spring hinge, nonetheless, other hinges may be used such as overlay hinge, an offset hinge, a piano hinge, strap hinge, or any variation thereof. Said hinge 66 may be used to join said door 64 and said wedge shield 62 together, while allowing said door 64 to rotate relative to said wedge shield 62. Said cable clamp 68 may be located in the inner face of said door 64. Said cable clamp 68 may be made of metal, however, said cable clamp 68 may be made of different materials such as plastic. Said cable clamp 68 may be used to sustain the charging cord of said industrial floor scraper 22 so that a user may have easy access to said charging cord without needing to detach the wedge shield.

Said side shield assembly 80 includes a side shield 82. Said side shield 82 may be made of a sturdy material such as steel, carbon steel, aluminum, alloy steel, stainless steel, or any variation thereof. Said front shield 82 may have a substantially rectangular shape, nonetheless, said side shield 82 may have another shape, such as a cuboid shape, a quadrangular shape, or any variation thereof. Said side shield 82 may have different dimensions depending on the size of an industrial floor scraper where the side shield 82 may be mounted. In a preferable embodiment said side shield 82 may be volumetrically efficient to be mounted on a lateral side of a commercial industrial floor scraper 24. The side shield 82 may be hollow. Said side shield 82 may be used to protect electrical connections and hydraulic hoses 26 from sharp debris that may be fired when said industrial floor scraper 22 is removing material. Said side shield 82 may permit a user to inspect the condition of electrical connections and hydraulic hoses 26 without needing to remove said side shield 82. Said side shield 82 may be mounted to a manufactured frame of said industrial floor scraper 22. Said plurality of fasteners 52 may be used for mounting said side shield 82 to said industrial floor scraper 22. When said side shield 82 may be located in a suitable place, said side shield 82 may be attached using said plurality of fasteners 52. In order to lock said side shield 82, said plurality of washers 54 and said plurality of nuts 56 may be coupled with said plurality of fasteners 52.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. An industrial floor scraper equipment shield, comprising:
   a. an industrial floor scraper assembly including an industrial floor scraper with exposed hydraulic hoses;
   b. a front shield assembly including a front shield, wherein said front shield includes a mounting bracket that engages with an industrial floor scraper front end;

c. a wedge shield assembly including a wedge shield, a door hingedly mounted to a wedge shield top portion, wherein said door provides access to the hydraulic hoses; and d. a side shield assembly including a side shield.

2. The industrial floor scraper equipment shield of claim 1, wherein said front shield, said wedge shield and said side shield is made of metal.

3. The industrial floor scraper equipment shield of claim 1, wherein said industrial floor scraper equipment shield includes a fastening assembly.

4. The industrial floor scraper equipment shield of claim 3, wherein said fastening assembly further includes a plurality of fasteners, a plurality of washers, and a plurality of nuts.

5. The industrial floor scraper equipment shield of claim 3, wherein said fastening assembly is used to attach said side shield and said wedge shield to said industrial floor scraper.

6. The industrial floor scraper equipment shield of claim 1, wherein said industrial floor scraper assembly includes an actuator, said actuator is a hydraulic actuator.

7. The industrial floor scraper equipment shield of claim 6, wherein said front shield is mounted on said actuator.

8. The industrial floor scraper equipment shield of claim 1, wherein said wedge shield is mounted on a lateral side of said industrial floor scraper.

9. The industrial floor scraper equipment shield of claim 1, wherein said side shield is mounted on a lateral side of said industrial floor scraper, opposite to said wedge shield.

10. An industrial floor scraper equipment shield, comprising:

a. an industrial floor scraper assembly including an industrial floor scraper, an actuator and exposed hydraulic hoses;

b. a front shield assembly, wherein said front shield assembly includes a front shield, a mounting bracket, and a shear pin, said front shield is mounted on said actuator, said front shield is configured to protect actuator from flying debris, said shear pin goes through said mounting bracket to engage said front shield to said actuator;

c. a fastening assembly including a plurality of fasteners, a plurality of washers and a plurality of nuts;

d. a wedge shield assembly including a wedge shield, a cable clamp, a hinge and a door, said wedge shield is coupled at one side of said industrial floor scraper using said fastening assembly, said wedge shield covers exposed hydraulic hoses, said door is hinge-coupled to a top portion of said wedge shield, gives access to said hydraulic hoses, said cable clamp is attached in an internal face of said door, said cable clamp is used to hold a charging cord of said industrial floor scraper; and e. a side shield including a side shield, said side shield is mounted on a side of said industrial floor scraper opposite to said wedge shield, said side shield covers exposed hydraulic hoses, said side shield is coupled to said industrial floor scraper using said fastening assembly.

11. An industrial floor scraper equipment shield, consisting of:

a. an industrial floor scraper assembly including an industrial floor scraper, an actuator and exposed hydraulic hoses, said actuator is a hydraulic actuator;

b. a front shield assembly, wherein said front shield assembly includes a front shield, a mounting bracket, a shear pin, and a cotter pin, said front shield is mounted on said actuator, said front shield is configured to protect said actuator from flying debris, said front shield is made of metal, said shear pin goes through said mounting bracket to engage said front shield to said actuator, said cotter pin is used to lock said shear pin in place;

c. a fastening assembly including a plurality of fasteners, a plurality of washers and a plurality of nuts, each fastener from said plurality of fasteners is a screw;

d. a wedge shield assembly including a wedge shield, a cable clamp, a hinge and a door, said wedge shield is coupled at one side of said industrial floor scraper using said fastening assembly, said wedge shield is made of metal, said wedge shield covers exposed hydraulic hoses, said door is hinge-coupled to a top portion of said wedge shield, said door is configured to permit a user to access to said hydraulic hoses, said cable clamp is attached in an internal face of said door, said cable clamp is used to hold a charging cord of said industrial floor scraper; and e. a side shield including a side shield, said side shield is mounted on a side of said industrial floor scraper opposite to said wedge shield, said side shield covers exposed hydraulic hoses, said side shield is coupled to said industrial floor scraper using said fastening assembly, said side shield is made of metal.

* * * * *